No. 691,579.
Patented Jan. 21, 1902.
W. W. BARTLETT.
BEET BLOCKER.
(Application filed Aug. 24, 1901.)
(No Model.)
2 Sheets—Sheet 1.
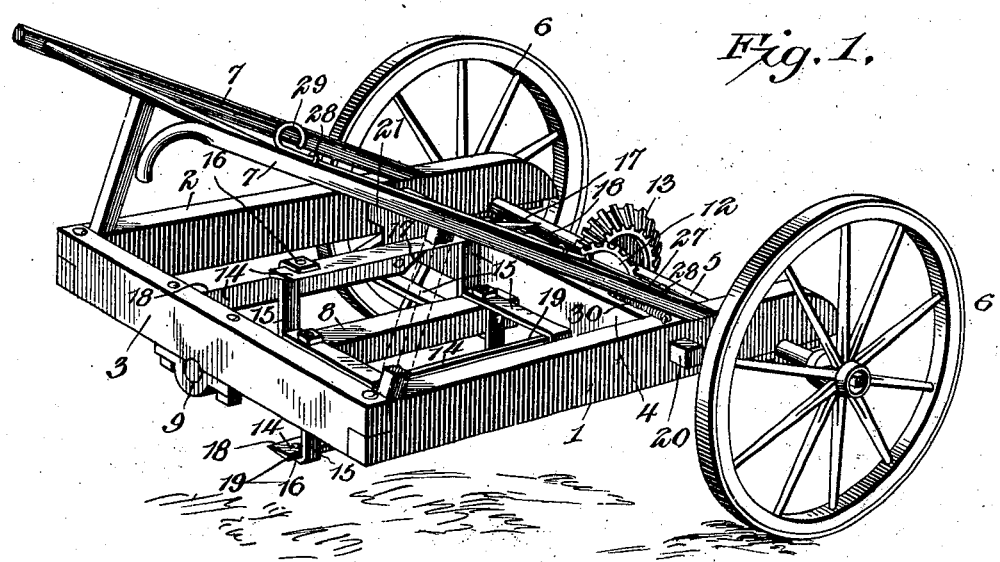
Fig. 1.
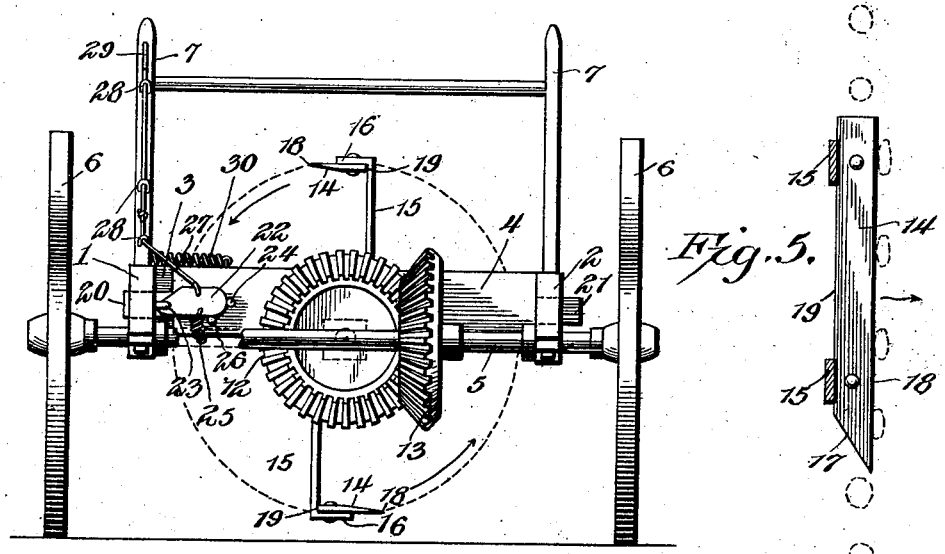
Fig. 4.
Fig. 5.
William W. Bartlett, Inventor;
Witnesses
Howard D. Orr.
H. F. Shepard.
By
E. G. Siggers.
Attorney No. 691,579. Patented Jan. 21, 1902.
W. W. BARTLETT.
BEET BLOCKER.
(Application filed Aug. 24, 1901.)
(No Model.) 2 Sheets—Sheet 2.
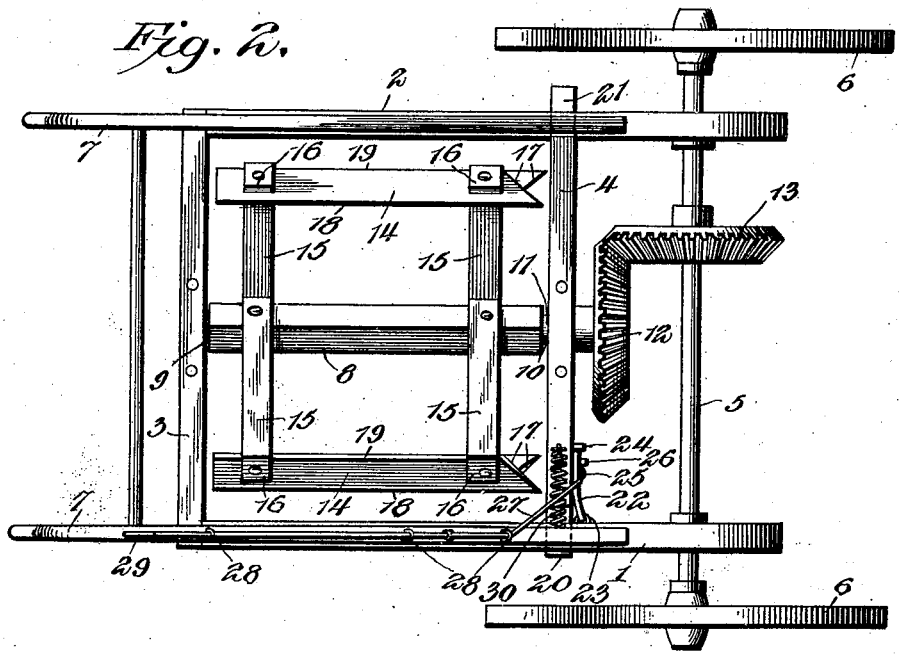
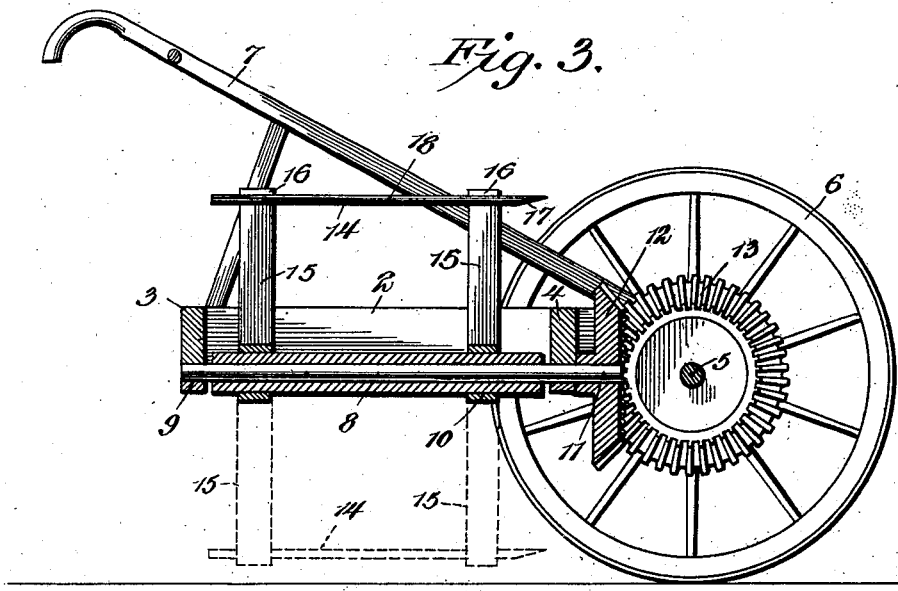
William W. Bartlett, Inventor:

UNITED STATES PATENT OFFICE.

WILLIAM WALLACE BARTLETT, OF WHEELER, MICHIGAN, ASSIGNOR OF ONE-HALF TO FRANK LAMPHIER, OF WHEELER, MICHIGAN.

BEET-BLOCKER.

SPECIFICATION forming part of Letters Patent No. 691,579, dated January 21, 1902.

Application filed August 24, 1901. Serial No. 73,187. (No model.)

*To all whom it may concern:*

Be it known that I, WILLIAM WALLACE BARTLETT, a citizen of the United States, residing at Wheeler, in the county of Gratiot and State of Michigan, have invented a new and useful Beet-Blocker, of which the following is a specification.

This invention relates to agricultural implements, and has for its object to provide an improved plant-chopping machine which is especially designed for blocking beets or cutting out blocks or sections of plants, so as to leave stools of standing plants separated by the spaces left by the cutting out of the other plants. It is furthermore designed to insure a quick and positive operation of the cutters to effectually chop the plants and to prevent tearing or damage to the plants left standing.

Another object resides in the provision of a light and durable machine which may be conveniently propelled by hand-power and is also adapted for horse-power, and finally it is designed to arrange for conveniently controlling the operation of the cutting or chopping knives, so as to stop the movement of the latter whenever desired—as, for instance, when transporting the machine from one place to another.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of a beet-blocking machine embodying the present invention. Fig. 2 is a top plan view thereof. Fig. 3 is a longitudinal sectional view. Fig. 4 is a front end view of the machine. Fig. 5 is a detail view of one of the chopping-knives.

Like characters of reference designate corresponding parts in all the figures of the drawings.

In carrying out the present invention there is provided a substantially rectangular frame consisting of the opposite side bars 1 and 2, which are connected by means of a rear cross-bar 3 and an intermediate endwise-shiftable bar 4. In front of the intermediate cross-bar is a transverse shaft 5, which has its opposite ends mounted in a suitable manner upon the under sides of the front ends of the respective side bars and also carries the opposite wheels 6, located exteriorly of the frame. Suitable handle members 7 incline upwardly and rearwardly from the forward end portions of the upper opposite sides of the frame for convenience in pushing and guiding the machine.

Located centrally within the frame is a longitudinal rotatable shaft 8, which is preferably polygonal in shape and has its opposite ends mounted in the respective cross-bars, as indicated at 9 and 10, the forward journal 11 being projected in front of the intermediate cross-bar and provided with a beveled gear 12, that lies between the transverse supporting-shaft and the cross-bar 4, said gear also being in mesh with a beveled drive-gear 13, carried by the supporting-shaft, whereby motion is transferred to the cutter-shaft from the supporting-wheels of the machine.

The cutting or chopping operation of the machine is performed by means of a plurality of cutters or knives 14, each of which is in the form of a comparatively thin flat blade that is disposed substantially parallel with the cutter-shaft and is connected thereto by means of a pair of arms 15, the inner ends of which are secured flat against one side of the shaft, and other outer ends are provided with terminal laterally-projected portions 16, which embrace the rear edge of the adjacent knife and are secured by suitable fastenings flat against the outer side of the blade. Each blade also projects at opposite ends beyond the supporting-arms and has its forward end beveled transversely, as indicated at 17, whereby the front or cutting edge 18 is longer than the inactive back edge 19 for a purpose as will be hereinafter explained. It will be noted that the space within the frame of the machine is just large enough to permit of a free operation of the chopping-knives, which are thereby somewhat protected by the frame.

In order that the rotatable chopper may be held inactive, it is designed to provide for throwing the chopper-shaft out of gear, and to accomplish this the intermediate cross-bar 4 is provided with opposite reduced tenons 20 and 21, of which the tenon 21 is the longer, and the length of the bar is somewhat less than the distance between the opposite longitudinal sides of the frame, the tenons being slidably fitted within suitable openings or mortises formed in the sides of the frame, whereby the bar may be adjusted in an endwise direction to throw the gear 12 out of mesh with the drive-gear 13.

To effect a convenient adjustment of the cross-bar 4, it is normally held at one limit by means of a latch 22, which is located in front of the cross-bar 4 and is pivotally mounted upon the inner face of the side bar 2, as indicated at 23, and is constructed to engage a lateral projection or keeper 24, carried by the front side of the cross-bar, whereby the latch is adapted to wedge in between the side of the frame and the cross-bar to hold the latter at one limit with the two gears in mutual engagement. A suitable spring 25 is connected to the latch and the lower portion of the cross-bar, so as to yieldably hold the latch in its normal located position, there being a suitable projection 26 carried by the cross-bar and arranged for engagement with the lower side of the latch, so as to form a stop to limit the downward movement thereof. A pull cord or wire 27 is connected to the latch and is extended upwardly upon the adjacent handle member and through suitable guides 28 thereon, the upper end of the rod or guide being provided with a handle 29, which is adjacent to the upper end of the handle 7, so as to be located in convenient access for disengaging the latch from the endwise-movable cross-bar. A helical spring 30 has its opposite ends connected to the top of the cross-bar and the side piece 2 of the main frame, so as to automatically shift the cross-bar when the latch is disengaged therefrom, whereby the machine is readily thrown out of gear and the rotation of the chopping device is stopped. It will of course be understood that the latch must be manually operated to throw the same into engagement with the keeper to maintain the gears in mutual engagement for the operation of the chopping device.

In the manipulation of the machine it is placed astraddle of a row of beets and moved along the same, whereby the chopper is rotated with the longer active edges of the knives in advance, whereby each knife cuts out a block or section of the plants, there being a stool of four or five plants left standing by reason of the interval between adjacent knives. It will here be noted that by reason of the beveled shape of the forward end of each blade there is no tearing or pulling of the plants left standing, as the beveled end portion clears or slides by the plants in rear of the cutting edge of the knife, which operation is material and highly important, as the standing plants would be otherwise torn and damaged to a considerable extent if the forward end of the blade were not beveled.

From the foregoing description it will be apparent that the present invention provides an exceedingly simple and durable machine which may be conveniently operated either by hand or horse power and is arranged to be readily thrown out of gear whenever desired. Moreover, power is applied to the chopping apparatus in a convenient and effective manner, and said cutting apparatus is constructed and arranged to effectually chop the plants without damaging those plants that are left standing.

What I claim is—

1. In a machine of the character described, the combination with a wheeled frame, of a rotatable cutting apparatus mounted thereon and in operative relation with the supporting-wheels of the frame, an endwise-shiftable frame-bar supporting one end of the cutting apparatus, and means to shift said bar and throw the cutting apparatus out of gear.

2. In a machine of the character described, the combination with a wheeled frame, of a rotatable cutting apparatus mounted thereon and in operative relation to the supporting-wheels of the frame, an endwise-shiftable frame-bar supporting one end of the cutting apparatus, locking means for holding said bar at one limit with the cutting apparatus in gear with the supporting-wheels, an unlocking device for said means, and a spring to shift the movable frame-bar when the latter is unlocked.

3. In a machine of the character described, the combination with a wheeled frame, of a rotatable cutting apparatus in operative relation to the wheels of the frame, an endwise-shiftable frame-bar carrying one end of the cutting apparatus, a latch mounted upon the frame and constructed for engagement with the shiftable bar to hold the latter at one limit, means for unlocking the latch, and a spring for shifting the movable frame-bar when the latter is unlocked.

4. In a machine of the character described, the combination with a wheel-supported frame, of a rotatable cutting apparatus in operative relation to the supporting-wheels of the frame, an endwise-shiftable cross-bar having opposite tenons slidably mounted in openings formed in the respective side bars of the frame, a latch pivotally mounted upon one of the side bars of the frame, a keeper carried by the cross-bar and constructed for engagement by the latch, a spring to normally hold the latch in engagement with the keeper, means for unlocking the latch, and a helical spring having one end connected to the said side bar of the frame and its opposite end connected to the shiftable cross-bar, said spring being normally under tension to shift the cross-bar when the latch is unlocked.

5. In a machine of the character described, the combination with a frame, consisting of opposite side bars and a rear cross-bar, of a transverse shaft mounted in the front ends of the side bars, supporting-wheels carried by the shaft, an intermediate endwise-movable cross-bar supported upon the side bars and located between the shaft and the rear end bar, a rotatable cutter journaled between the opposite cross-bars and having its forward journal projected beyond the intermediate cross-bar, intermeshed beveled gears upon the shaft and the projected journal, a latch pivoted upon one of the side bars and constructed for engagement with the shiftable cross-bar to hold the gears in mesh, means for releasing the latch, and a helical spring connected at opposite ends to the shiftable bar and the adjacent side bar of the frame to shift the cross-bar when the latch is unlocked.

6. In a machine of the character described, the combination with a wheeled frame, of an endwise-shiftable cross-bar carried by the frame, a longitudinally-disposed rotatable shaft having one end mounted upon the shiftable cross-bar and in operative relation to the supporting-wheels, means for shifting the cross-bar to throw the shaft out of gear, a plurality of laterally-projected arms carried by the shaft, and cutting-knives carried by the outer ends of respective arms and having their forward ends beveled rearwardly from the cutting edges thereof.

In testimony that I claim the foregoing as my own I have hereto affixed my signature in the presence of two witnesses.

WILLIAM WALLACE BARTLETT.

Witnesses:
FRANK E. LAMPHERE,
HERBERT V. SIMPKINS.